June 2, 1936.  V. W. KLIESRATH  2,042,717

CLUTCH CONTROL

Filed Aug. 28, 1931

INVENTOR.
VICTOR W. KLIESRATH
BY
ATTORNEY

Patented June 2, 1936

2,042,717

UNITED STATES PATENT OFFICE 2,042,717

CLUTCH CONTROL

Victor W. Kliesrath, South Bend, Ind., assignor to Bragg-Kliesrath Corporation, South Bend, Ind., a corporation of New York Application August 28, 1931, Serial No. 559,988

9 Claims. (Cl. 192—.01)

This invention relates to clutches, and is illustrated as embodied in a novel automatically-controlled vacuum-actuated automobile clutch. Preferably the device is of the type in which the clutch is controlled from the accelerator pedal, being thrown out automatically when the accelerator is released, thus giving a free-wheeling effect.

An object of the invention is to provide means for varying the timing of the valve or other control device, so that it may be made very sensitive and easily operated for the purpose of controlling the clutch when shifting gears, and yet be relatively insensitive when used at road speeds to secure the desired free-wheeling action, thereby minimizing for example any fluttering of the clutch due to a nervous foot action of the driver.

In one desirable arrangement the valve is connected for operation by the accelerator, preferably by its movement beyond its normal throttle-controlling range, and driver-operated means (preferably carried by the gear-shift lever) is arranged for varying the timing of the valve by varying the length of the valve operating connection.

Various features of the invention relate to novel details of construction, and advantageous arrangements, in the two valve-controlling means, and in other parts of the system which will be apparent from the following description of the illustrative embodiment shown in the accompanying drawing, in which.

Figure 1:
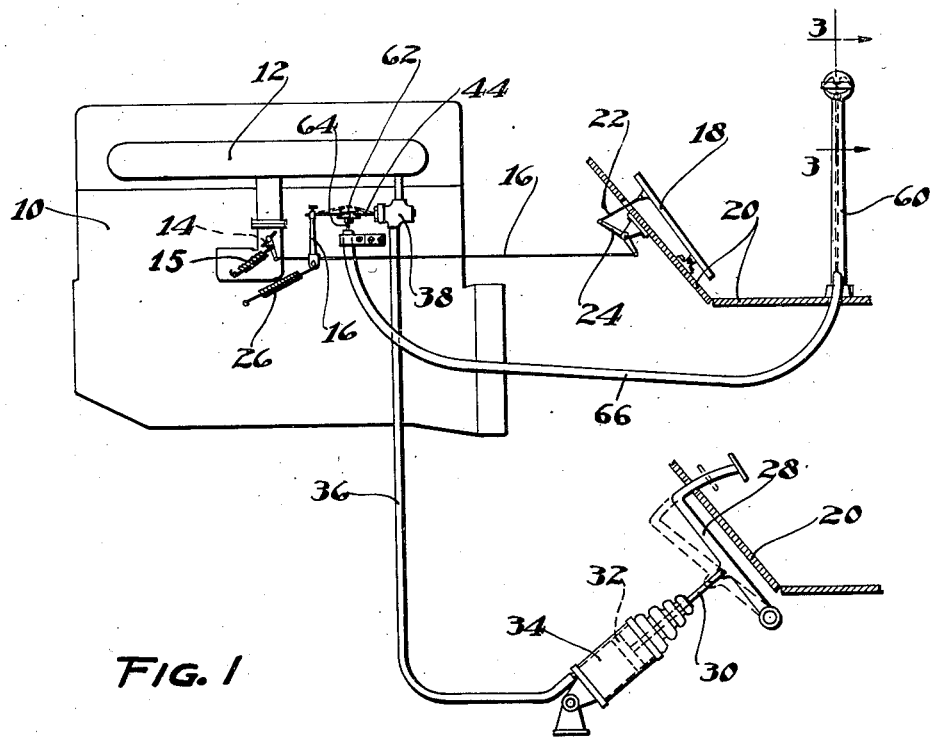
Figure 1 is a diagrammatic longitudinal section through the car, showing the duplex clutch control in side elevation.

In the arrangement illustrated, the vehicle has an engine 10 provided with a manifold 12, the engine speed being controlled by means such as a throttle 14 actuated through a flexible connection 16 from an accelerator 18 shown as a pedal pivotally mounted on the floor-board 20. A spring 15 is provided and normally urges the throttle to its closed position. Pedal 20 may have a thrust link 22 extending through an opening in the floor-board and acting on a pivoted lever 24 which actuates connection 16 against the resistance of a return spring 26 which tends to close the throttle.

The engine 10 is connected to the road wheels through a transmission and a clutch (not shown) in the usual manner, the clutch being operated by means such as the usual clutch pedal 28. This clutch pedal is shown connected, by means such as a link 30, to a piston 32 in a vacuum cylinder 34, the piston and cylinder forming a vacuum-power actuator for the clutch. Cylinder 34 is connected to the manifold 12 by a conduit 36, to actuate the clutch by the power of the manifold suction.

Figure 2:
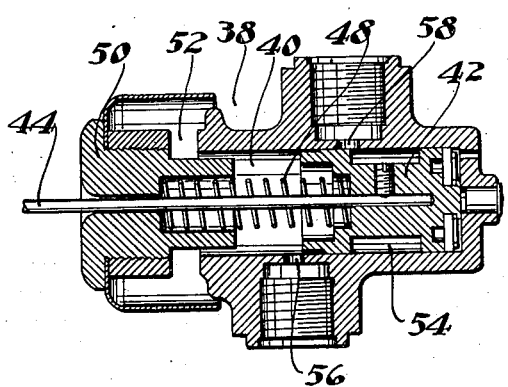
Figure 2 is a section through the control valve.
Figure 3:
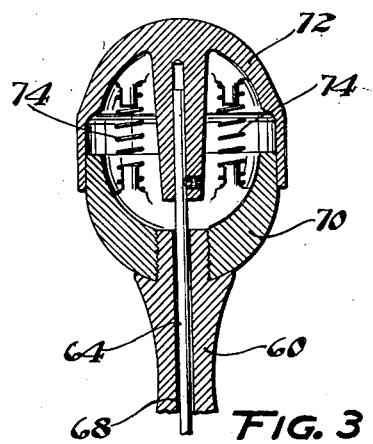
Figure 3 is a section through the upper part of the gear-shift lever.

The passage through the conduit 36 is controlled by means such as a valve 38 shown in detail in Figure 2. This valve preferably includes, in an outer casing having an internal bore 40 forming a valve cylinder, a piston valve 42 secured to one end of a flexible connection such as a wire 44, the other end of which is connected to a bracket or the like 46 fixedly secured to the connection 16. The valve piston 42 is urged toward the right by a spring 48, lighter than spring 26 and confined between the valve piston 42 and a plug 50 threaded into the end of the valve casing.

In the operation of the device as thus far described, when the accelerator 18 is depressed, as normally when the car is being driven on the road, spring 48 is permitted to shift the valve piston 42 to the extreme right, thereby connecting air passages 52 through the bore 40 of the valve with the lower section of conduit 36 and therefore with the vacuum cylinder 34. Thus the usual clutch spring (not shown) holds the clutch engaged, with the clutch pedal 28 in its upper (full-line) position.

If now the accelerator 18 is released, springs 15 and 26 shift the various parts, spring 15 first closing the throttle 14 and then, with the engine idling, spring 26 acts on wire 44 to compress spring 48, bringing an annular space 54 in the valve piston 42 into registry with the opening 56 which communicates with the vacuum cylinder 34. Space 54 is at all times in registry with an opening 58 communicating with the manifold 12. Therefore the suction from the manifold now pulls down the clutch pedal 28 into dotted-line position, throwing out the clutch.

The cylinder 34 may be provided with suitable buffing means for damping the clutch action on the reverse or clutch-engaging stroke, to ease the clutch into engagement, but as this means forms no part of the present invention it is not herein illustrated.

As described above, the clutch control comes into action in sequence to the throttle control, thereby minimizing fluttering of the clutch in the case of a nervous driver who "rides" the clutch. In shifting gears, however, it is desirable to make the valve action much more sensitive, and in fact to make it substantially concurrent with the final movement of the throttle as the latter approaches and reaches its closed position. Accordingly an important feature of the invention relates to the provision of auxiliary control means for varying the timing of the valve.

In order to make it easy of operation when shifting gears, I prefer to associate this auxiliary means with the second speed-controlling device of the car, i. e., with the gear-shift lever 60 which controls the gear ratios in the transmission (not shown). In the arrangement illustrated, connection 44 engages and is embraced by a grooved head 62 secured to the end of a flexible Bowden member or wire 64 which is guided by a flexible Bowden conduit 66. Conduit 66 is fixed at one end on the engine adjacent the valve, and at the other end is fixedly secured to the bottom of gear-shift lever 60 in registry with the lower end of a passage 68 formed through the lever.

The upper end of the gear-shift lever is in the form of a two-part ball, part 70 being fixed to the lever and part 72 being secured to the end of the wire 64 passing upwardly through the passage 68. Normally the two parts are urged apart by spring 74, and the device does not affect the first-described valve action. However, the driver in shifting gears can press downwardly on part 72, moving the space 54 closer to the port 56 so that the valve 42 acts substantially concurrently with the movement of the throttle just after the latter closes. This gives great sensitivity of action and facilitates the quick disengagement of the clutch in shifting gears. Obviously the part 72 may be depressed to such an extent as to provide for a registering of the space 54 in the valve with the port 56 before the throttle is closed by the spring 15. The valve would then be manipulated during the effective range of the throttle operation.

While one illustrative embodiment has been described in detail, it is not my intention to limit the scope of the invention to that particular embodiment, or otherwise than by the terms of the appended claims.

I claim:

1. A vehicle having a power-operated clutch, a throttle and a gear-shift lever, in combination with means for varying the relative timing of the operations of said throttle and clutch, said means being mounted in said gear-shift lever.

2. A vehicle having a manifold provided with a throttle and having an accelerator, a first connection from the accelerator to said throttle, a power unit having a conduit connecting it to the manifold and provided with a valve controlling the passage through the conduit, a second connection from the valve to said first connection, and means acting on said second connection to vary the relative timing of the operation of the throttle and cracking of the valve.

3. A vehicle provided with a clutch, throttle and accelerator, and power means for operating the clutch, a control valve for said power means, means interconnecting said throttle, valve and accelerator, and means for varying the relative timing of operation of the throttle and cracking of said valve with operation of the accelerator.

4. A vehicle provided with a clutch, throttle and accelerator, and power means for operating the clutch, a control valve for said power means, means interconnecting the throttle, valve and accelerator, said means comprising an adjustable flexible member for varying the relative timing of operation of the throttle and cracking of said valve with operation of the accelerator.

5. A vehicle provided with a clutch, a throttle and an accelerator, and power means for operating the clutch, a control valve for said power means, means interconnecting said throttle and accelerator, and other means connecting said aforementioned connecting means and valve, said second mentioned connecting means comprising a flexible member adjustable as to its effective length.

6. A vehicle provided with a clutch, a throttle and an accelerator, and power means for operating the clutch, a control valve for said power means, flexible means interconnecting said throttle and accelerator, a spring acting to close said throttle and acting on said flexible means, and a connection interconnecting said valve and first mentioned connection.

7. A vehicle provided with a clutch, a throttle and an accelerator, and power means for operating the clutch, a control valve for said power means, flexible means interconnecting said throttle and accelerator, a spring acting to close said throttle and acting on said flexible means, and a connection interconnecting said valve and first mentioned connection, said latter connection comprising a spring-actuated yieldable member.

8. A vehicle provided with a clutch, a throttle and an accelerator, and power means for operating the clutch, a control valve for said power means, means interconnecting said throttle and accelerator, spring means acting to close said throttle upon release of said accelerator, a connection interconnecting said valve and first mentioned connection, said latter connection being adjustable as to its effective length to vary the relative timing of operation of said throttle and cracking of said valve.

9. A vehicle having a manifold provided with a throttle and having an accelerator actuating the throttle, a power unit having a conduit connecting it to the manifold and provided with a valve controlled by the accelerator, means interconnecting said throttle, valve and accelerator, and means for varying the relative timing of the cracking of said valve and operation of the accelerator.

VICTOR W. KLIESRATH.